United States Patent [19]

Fujibayashi et al.

[11] Patent Number: 5,405,701
[45] Date of Patent: Apr. 11, 1995

[54] RESIN COMPOSITION FOR AQUEOUS COATING CONTAINING GLYCIDYL AMINES

[75] Inventors: Toshio Fujibayashi, Hadano; Haruo Nagaoka, Hiratsuka, both of Japan

[73] Assignee: Kansai Paint Co., Ltd., Hyogo, Japan

[21] Appl. No.: 45,861

[22] Filed: Apr. 15, 1993

[30] Foreign Application Priority Data

Apr. 15, 1992 [JP] Japan .................................. 4-119921

[51] Int. Cl.⁶ .................... C08G 59/02; C07D 303/12; C08L 63/00
[52] U.S. Cl. .................................. 428/418; 523/404; 523/410; 523/414; 523/415; 525/109; 525/117; 525/526; 528/393
[58] Field of Search ................ 523/404, 414, 410, 415; 525/526, 109, 117; 528/393; 428/418

[56] References Cited

U.S. PATENT DOCUMENTS

| | | | |
|---|---|---|---|
| 2,450,940 | 10/1948 | Cowan et al. | 260/404.5 |
| 2,951,822 | 9/1960 | Reinking | 549/552 |
| 3,403,088 | 9/1968 | Hart | 204/181 |
| 3,454,482 | 7/1969 | Spoor et al. | 204/181 |
| 3,455,806 | 7/1969 | Spoor et al. | 204/181 |
| 3,891,529 | 6/1975 | Beesch | 204/195 |
| 3,963,663 | 6/1976 | Sekmakas | 260/29.3 |
| 4,001,101 | 1/1977 | Bosso et al. | 204/181 |
| 4,565,859 | 1/1986 | Murai et al. | 528/365 |
| 5,147,906 | 9/1992 | Nishida et al. | 525/117 |

FOREIGN PATENT DOCUMENTS

| | | |
|---|---|---|
| 0356970 | 3/1990 | European Pat. Off. . |
| 62-135467 | 6/1987 | Japan . |
| 1306101 | 2/1973 | United Kingdom . |
| 1306102 | 2/1973 | United Kingdom . |
| 1327071 | 8/1973 | United Kingdom . |
| 1411249 | 10/1975 | United Kingdom . |

OTHER PUBLICATIONS

Lee and Neville, "Handbook of Epoxy Resins", Copyright 1967, pp. 7-3, 7-19 and 7-20.

*Primary Examiner*—Frederick Krass
*Attorney, Agent, or Firm*—Wenderoth, Lind & Ponack

[57] ABSTRACT

A resin composition for aqueous coating, comprising as main components
(A) a resin having hydroxyl groups and cationic groups, and
(B) a compound having, in the molecule, at least two glycidyl groups each in a glycidylamino group represented by the following formula

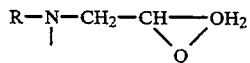

(R is a group selected from a hydrogen atom and a glycidyl group) directly bonding to carbon atoms of the aromatic ring. This composition is excellent in storage stability, low-temperature curability, etc. and is useful in cationic electrocoatings, in particular.

25 Claims, No Drawings

RESIN COMPOSITION FOR AQUEOUS COATING CONTAINING GLYCIDYL AMINES

BACKGROUND OF THE INVENTION

1. Field of the Invention

The present invention relates to a resin composition for aqueous coating useful in cationic electro-coatings, in particular.

2. Description of the Related Art

Cationic electrocoatings each comprising, as the main components, a polyamine resin (e.g. amino-epoxy resin adduct) and a blocked polyisocyanate compound have been used in a large amount for their excellence in corrosion resistance, etc. These cationic electro-coatings, however, have various problems as listed below and solutions thereof are required strongly.

(1) The film of such a cationic electrocoating begins to cure at a temperature of 170° C. or more, which is too high.

(2) When the film of the cationic electro-coating is heated at high temperatures, the blocked polyisocyanate compound causes thermal decomposition and generates a resinous tar and soot, which allows the top coating film to give rise to yellowing, bleeding and insufficient curing, gives significantly reduced weather resistance and tends to cause whitening.

(3) The cationic electrocoating generally uses an organotin compound as a catalyst for lowering the initial temperature of curing. This compound poisons, in some cases, catalysts for exhaust gas combustion used in passenger cars.

Resins for self-crosslinking electrocoatings using no curing agent are also known and were proposed in, for example, GB-B-1327071, BG-B-1306101, BG-B-1306102, U.S. Pat. No. 4,001,101 and GB-B-1411249. None of these resins can satisfy both of the bath stability and film curability of electrocoating. Specifically, most common epoxy compounds of glycidyl ether type, for example, bisphenol A diglycidyl ether and novolac phenyl polyglycidyl ether, have excellent curability but inferior bath stability.

A composition using, as the curing agent, an epoxy resin having an alicyclic skeleton and/or a bridged alicyclic skeleton, which has been proposed by the present applicant in EP-A-356970, achieved most of the objects intended therein but is insufficient in film properties when baking was conducted at low temperatures for a short period of time.

The present inventors made an extensive study with a main aim of developing a resin composition for aqueous coating useful particularly in cationic electro-coatings, which uses neither blocked polyisocyanate compound nor organotin compound and which is free from the above-mentioned problems when an epoxy resin having an alicyclic skeleton and/or a bridged alicyclic skeleton is used as a curing agent. As a result, the present inventors found that a compound having, in the molecule, at least two glycidyl groups each in a glycidylamino group represented by general formula (I) (shown later) directly bonding to carbon atoms of the aromatic ring, is very useful as a curing agent for a resin having hydroxyl groups and cationic groups and can solve all of the above-mentioned problems. The finding has led to the completion of the present invention.

The curing agent identified by the present inventors does not substantially react, in an electro-coating bath at room temperature, with an acidic component (e.g. neutralizing agent), the hydroxyl group(s) of a base resin, etc. and resultantly gives excellent storage stability to the bath and further, as compared with the above-mentioned epoxy resin (curing agent) having an alicyclic skeleton and/or a bridged alicyclic skeleton, gives excellent low-temperature curability to the base resin. Moreover, the composition provided by the present invention requires neither blocked polyisocyanate compound nor organotin compound and is free from the above-mentioned problems caused by the use thereof.

SUMMARY OF THE INVENTION

The present invention provides a resin composition for aqueous coating, comprising as main components (A) a resin having hydroxyl groups and cationic groups, and (B) a compound having, in the molecule, at least two glycidyl groups each in a glycidylamino group represented by the following formula (I)

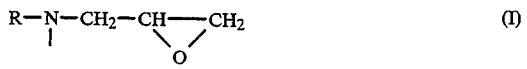
(I)

(R is a group selected from a hydrogen atom and a glycidyl group) directly bonding to carbon atoms of the aromatic ring.

The present invention further provides a resin composition for aqueous coating, comprising the above component (A), the above component (B) and, as a curing agent, (C) at least one compound selected from the group consisting of lead compounds, zirconium compounds, cobalt compounds, aluminum compounds, manganese compounds, copper compounds, zinc compounds, iron compounds, bismuth compounds and nickel compounds.

The present invention furthermore provides a cationic electrocoating containing the above resin composition for aqueous coating and a coated article which is coated with the cationic electrocoating.

The electrocoating film formed by a cationic electrocoating composed mainly of the resin composition of the present invention for aqueous coating can be cured at a temperature of about 250° C. or less. When the resin composition contains a curing catalyst (C), said film can be sufficiently cured as a temperature at low as about 70°–160° C. The mechanisms for these curing reactions are not yet clarified but are presumed to be as follows. The glycidyl groups in the component (B) cause ring opening, followed by (1) etherification with the hydroxyl group(s) [preferably, primary hydroxyl groups] in the component (A) and (2) bonding with each other to form ether bonds; thus, a crosslinked structure is formed.

The main technical advantages provided by the resin composition of the present invention for aqueous coating, are as follows.

(1) Film curing is possible at a temperature of 160° C. or less using no tin catalyst. Therefore, all the problems caused by the use of a tin catalyst can be eliminated.

(2) No blocked polyisocyanate compound is required. Therefore, all the problems caused by the use of a blocked polyisocyanate compound can be eliminated.

(3) Since there is no volume contraction due to thermal decomposition, a coating film having good surface smoothness can be formed.

(4) Since neither urethane bond nor aromatic urea bond is formed in the crosslinking curing reaction, the corrosion resistance is not impaired.

(5) The coating film is excellent in corrosion resistance, curability, etc.

(6) Gives an electrocoating bath of excellent stability.

(7) Film curing takes place quickly even under the baking conditions of low temperature and short time, whereby a coating film of excellent properties is formed.

DETAILED DESCRIPTION OF THE INVENTION

The components constituting the resin composition for aqueous coating according to the present invention are described in more detail below.

Component (A): a resin having hydroxyl group(s) and cationic groups in the molecule This resin is not particularly restricted as long as it has hydroxyl groups, particularly primary hydroxyl groups capable of reacting with the epoxy groups (glycidyl groups) of the component (B) and cationic groups necessary for the formation of a stable aqueous dispersion, and can be selected from a wide range. Specific examples of the resin are as follows.

(1) A product obtained by reacting a polyepoxy resin with a cationizing agent.

(2) A polycondensate between a polycarboxylic acid and a polyamine (U.S. Pat. No. 2,450,940).

(3) A composition comprising (a) a product obtained by protonating a polyaddition product between a polyol and a mono- or polyamine with an acid and (b) a polyisocyanate compound.

(4) A product obtained by protonating an acrylic or vinyl resin having hydroxyl group(s) and amino group(s), with an acid (U.S. Pat. Nos. 3,455,806 and 3,454,482).

(5) A product obtained by protonating an adduct between a polycarboxylic acid resin and an alkyleneimine with an acid (U.S. Pat. No. 3,403,088).

More specific definitions of these resins and their production processes are described in, for example, U.S. Pat. Nos. 3,455,806, 3,454,482, GB-B-1327071, U.S. Pat. Nos. 2,450,940, 3,403,088, 3,891,529 and 3,963,663. Therefore, the description is not repeated herein.

In the present invention, the component (A) includes, as a preferable example, a resin obtained by reacting an epoxy resin (A-1) having, in the molecule, at least three epoxy group-containing functional groups each represented by the following formula (II)

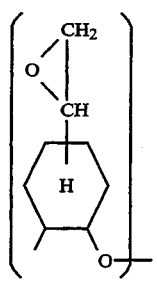

(II)

a primary or secondary amine compound (A-2) having at least one primary hydroxyl group in the molecule, and a phenol compound (A-3) having at least one phenolic hydroxyl group in the molecule.

The components (A-1), (A-2) and (A-3) used in production of a preferable resin (A), are described in detail below.

Component (A-1): an epoxy resin having, in the molecule, at least three epoxy group-containing functional groups represented by the above formula (II).

As the component (A-1), there can be used per-se-known resins described in, for example, U.S. Pat. No. 4,565,859 and Japanese Patent Application Kokai (Laid-Open) No. 135467/1987.

The component (A-1) further includes those in which a residue of a polymerization-initiating component, i.e. a residue of an active-hydrogen-containing organic compound is bonded to the end of the above formula (II). As the active-hydrogen-containing organic compound which is a precursor of said residue, there can be mentioned, for example, an alcohol, a phenol, a carboxylic acid, an amine and a thiol. The alcohol may be a monohydric or polyhydric alcohol and can be exemplified by aliphatic monohydric alcohols such as methanol, ethanol, propanol, butanol, pentanol, hexanol, octanol and the like; aromatic monohydric alcohols such as benzyl alcohol and the like; and polyhydric alcohols such as ethylene glycol, diethylene glycol, triethylene glycol, polyethylene glycol, propylene glycol, dipropylene glycol, 1,3-butanediol, 1,4-butanediol, pentanediol, 1,6-hexanediol, neopentyl glycol, oxypivalic acid-neopentyl glycol ester, cyclohexanedimethanol, glycerine, diglycerine, polyglycerine, trimethylolpropane, trimethylolethane, pentaerythritol, dipentaerythritol and the like.

As the phenol, there can be mentioned, for example, phenol, cresol, catechol, poyrogallol, hydroquinone, hydroquinone monomethyl ether, bisphenol A, bisphenol F, 4,4'-dihydroxybenzophenone, bisphenol S, a phenolic resin and a cresol novolac resin.

The carboxylic acid can be exemplified by formic acid, acetic acid, propionic acid, butyric acid, fatty acids of animal and vegetable oils, fumaric acid, maleic acid, adipic acid, dodecanedioic acid, trimellitic acid, pyromellitic acid, polyacrylic acid, phthalic acid, isophthalic acid and terephthalic acid. As the carboxylic acid, there can also be used compounds having hydroxyl group(s) and carboxyl group(s), such as lactic acid, citric acid, oxycaproic acid and the like.

As the active-hydrogen-containing organic compound, there can further be used a polyvinyl alcohol, a partial hydrolysis product of a polyvinyl acetate, starch, cellulose, cellulose acetate, cellulose acetate btyrate, hydroxyethyl-cellulose, an allyl polyol resin, a styrene-allyl alcohol copolymer resin, a styrene-maleic acid copolymer resin, an alkyd resin, a polyester polyol resin, a polycaprolactone polyol resin, etc. In the active-hydrogen-containing organic compound, unsaturated double bond(s) may be present in the skeleton together with the active hydrogen and the unsaturated double bond(s) may be epoxidized.

The component (A-1) can be obtained, for example, by subjecting 4-vinylcyclohexene-1-oxide alone or in the co-existence of other epoxy group-containing compound to ring-opening (co)polymerization by the epoxy group(s) contained therein, using an active-hydrogencontaining organic compound as an initiator to form a polyether resin, and then epoxidizing the vinyl groups of the 4-vinylcyclohexene-1-oxide portions present in the side chains of said resin, with an oxidizing agent such as peracid, hydroperoxide or the like to form functional groups each represented by formula (II).

The above 4-vinylcyclohexene-1-oxide can be obtained, for example, by subjecting butadiene to dimerization to form vinylcyclohexene and then subjecting it to partial epoxidization with a peracid.

The other epoxy group-containing compound is not particularly restricted as long as it has epoxy group(s) but, from the standpoint of production of the component (A-1), is preferably a compound having one epoxy group in the molecule. It can be exemplified by -olefin epoxides represented by the following formula

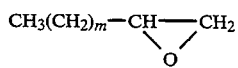

(m is 2–25), such as ethylene oxide, propylene oxide, butylene oxide and the like; oxides of unsaturated compounds, such as styrene oxide and the like; glycidyl ethers of hydroxyl group-containing compounds, such as allyl glycidyl ether, 2-ethylhexyl glycidyl ether, methyl glycidyl ether, butyl glycidyl ether, phenyl glycidyl ether and the like; and glycidyl esters of organic acids such as aliphatic acids and the like.

The other epoxy group-containing compound further includes vinyl monomers each having an alicyclic oxirane group having double bond(s). They can be exemplified by the following.

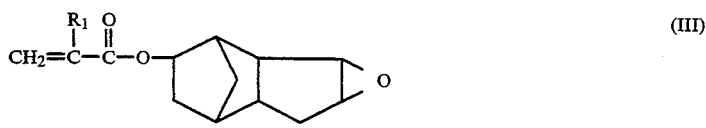

(III)

(IV)

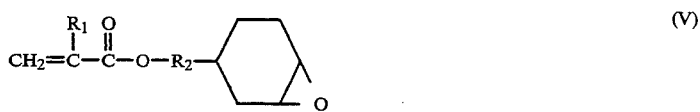

(V)

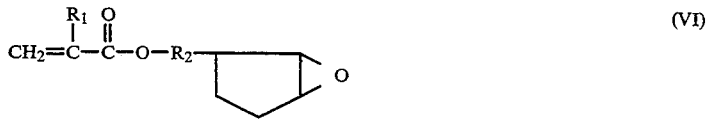

(VI)

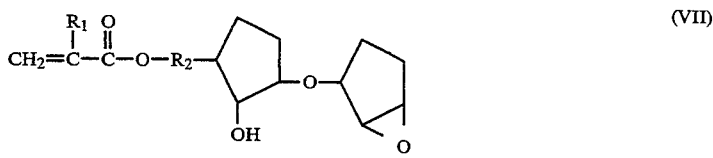

(VII)

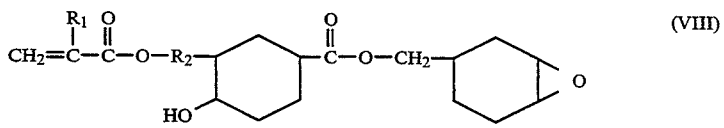

(VIII)

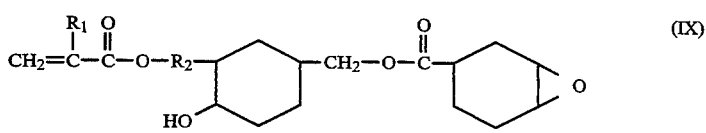

(IX)

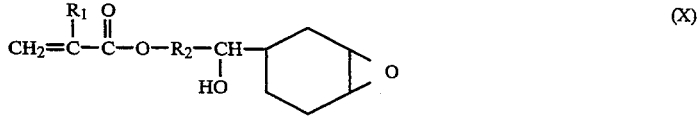

(X)

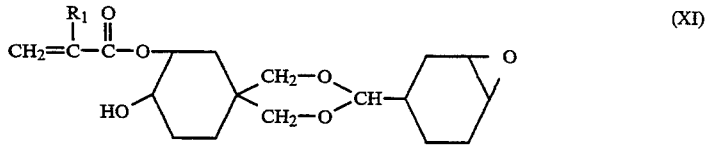

(XI)

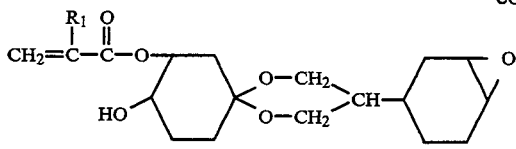 (XII)

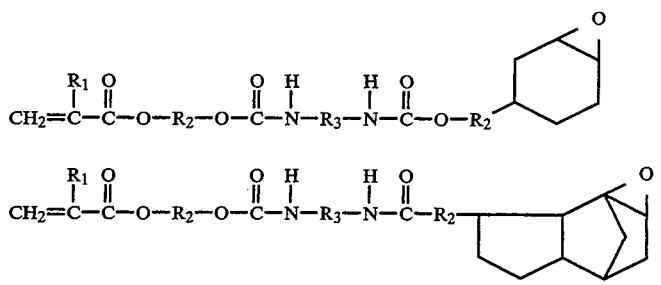 (XIII)

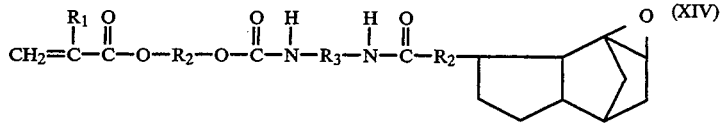 (XIV)

In each of the above formulas, $R_1$ represents a hydrogen atom or a methyl group; $R_2$ represents a bivalent aliphatic saturated hydrocarbon group of 1–6 carbon atoms; and $R_3$ represents a bivalent hydrocarbon group of 1–10 carbon atoms.

As the bivalent aliphatic saturated hydrocarbon group of 1–6 carbon atoms, represented by $R_2$, there can be mentioned straight-chain or branched chain alkylene groups such as methylene, ethylene, propylene, tetramethylene, ethylethylene, pentamethylene, hexamethylene and the like. As the bivalent hydrocarbon group of 1–10 carbon atoms, represented by R3, there can be mentioned, for example, methylene, ethylene, propylene, tetramethylene, ethylethylene, pentamethylene, hexamethylene, polymethylene, phenylene,

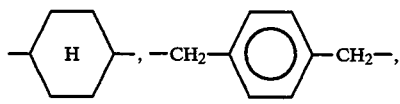

etc.

As the other epoxy group-containing compound, there can further be used compounds represented by the following general formula (XV)

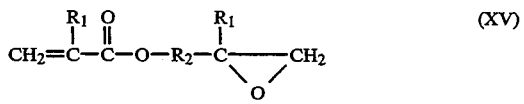 (XV)

($R_1$ and $R_2$ are as defined above), such as glycidyl acrylate, glycidyl methacrylate and the like; and compounds each having an alicyclic unsaturated group, represented by the following formula (XVI)

 (XVI)

which is obtained as a by-product when vinylcyclohexene is subjected to partial epoxidization. There can furthermore be used 4-vinylcycloheptene (vinylnorbornene), etc.

The ring-opening (co)polymerization reaction be epoxy group, of 4-vinylcyclohexene-1-oxide alone or in the co-presence of other epoxy group-containing compound is preferably conducted using an active-hydrogen-containing organic compound and further a catalyst. As the catalyst, there can be mentioned, for example, amines such as methylamine, ethylamine, propylamine, piperazine and the like; organic bases such as pyridine, imidazole and the like; organic acids such as formic acid, acetic acid, propionic acid and the like; inorganic acids such as sulfuric acid, hydrochloric acid and the like; alkali metal alcoholates such as sodium methylate and the like; alkalis such as KOH, NaOH and the like; Lewis acids or complexes thereof such as $BF_3ZnCl_2$, $AlCl_3$, $SnCl_4$ and the like; organometal compounds such as triethyl aluminum, diethyl zinc and the like.

The catalyst can be used in an amount of 0.001–10% by weight, preferably 0.1–5% by weight based on the materials to be reacted. The appropriate temperature of the ring-opening (co)polymerization reaction is generally about $-70°$ C. to about 200° C., preferably about $-30°$ C. to about 100° C. The reaction can be conducted using a solvent. The solvent is preferably an ordinary organic solvent having no active hydrogen.

By the above reaction can be obtained a polyether resin [a ring-opening (co)polymer] having vinyl groups in the side chains. The vinyl groups are epoxidized to introduce functional groups each represented by the above-mentioned formula (II) into the polyether resin, whereby a component (A-1) can be obtained. This epoxidization can be conducted using a peracid, a hydroperoxide or the like. As the peracid, there can be used, for example, performic acid, peracetic acid, perbenzoic acid and trifluoroperacetic acid. As the hydroperoxide, there can be used, for example, hydrogen peroxide, tert-butyl peroxide and cumene peroxide. The epoxidization reaction can be conducted using a catalyst, as necessary.

Epoxidization of the vinyl group of 4-vinylcyclohexene-1-oxide gives a functional group represented by the above formula (II). When in this epoxidization there co-exists, as the other epoxy group-containing compound, the above-mentioned vinyl monomer having an alicyclic oxirane group, the vinyl group in the monomer is epoxidized as well but gives a functional group different from that of formula (II).

The presence or absence of a solvent and reaction temperature used in the epoxidization reaction can be appropriately determined depending upon the equipment and raw materials used.

As the component (A-1), there can also be used commercial products, for example, EHPE 3150 (trade name) manufactured by DAICEL CHEMICAL INDUSTRIES, LTD. This product is obtained by subjecting 4-vinylcyclohexene-1-oxide to ring-opening polymerization and epoxidizing the vinyl groups in the resulting polymer, and has a polymerization degree of 4-15 on an average.

The amount of the epoxy group-containing functional group represented by formula (II), in the component (A-1) is appropriately at least three in terms of the number of the functional group and is preferably 140-1,000, more preferably 170-300 in terms of epoxy equivalents.

Component (A-2): a primary or secondary amine compound having at least one primary hydroxyl group in the molecule.

This component reacts with the component (A-1) and introduces a primary hydroxyl group and a basic group into the component (A-1).

The amine group in the component (A-2) reacts with the epoxy group of the epoxy group-containing functional group represented by formula (II), in the component (A-1) to form a cationic resin. This cationic resin having primary hydroxyl groups and basic groups, as compared with the above-mentioned resin formed by reaction with a conventional bisphenol A type epoxy resin, is much superior in dispersibility in water and throwing property even in a partially neutralized state or at a high pH, and the film formed therewith shows substantially no reduction in curability, corrosion resistance, etc.

The component (A-2) can be exemplified by the following compounds.

(1) Monoalkanolamines such as monoethanolamine, monopropanolamine, monobutanolamine and the like.

(2) N-alkylalkanolamines and dialkanolamines such as N-methylethanolamine, N-ethylethanolamine, diethanolamine, di-n (or iso)-propanolamine, dibutanolamine and the like.

(3) Adducts between monoalkanolamine and α,β-unsaturated carbonyl compound, such as monoethanolamine-N,N-dimethylaminopropylacrylamide adduct, monoethanolamine-hydroxyethyl (meth)acrylate adduct, monoethanolamine-hydroxypropyl (meth)acrylate adduct, monoethanolamine-hydroxybutyl (meth)acrylate adduct and the like.

(4) Monoalkanolaminoalkylamines such as hydroxyethylaminoethylamine and the like.

(5) Condensates between (a) at least one compound selected from hydroxyethylamine, hydroxyethylhydrazine and hydroxybutrylhydrazine and (b) a ketone compound, for example, a dialkylketone such as dimethyl ketone, methyl ethyl ketone, methyl isobutyl ketone, dibutyl ketone, dipropyl ketone or the like.

(6) Amine compounds having a primary hydroxyl group, a secondary amino group and an amido group in the molecule, represented by the following general formula (XVII)

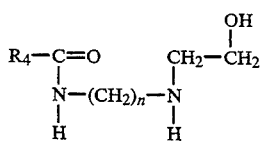

wherein n is an integer of 1-6 and $R_4$ is a hydrocarbon chain of 4-36 carbon atoms which may have a hydroxyl group and/or a polymerizable unsaturated group.

The "alkyl" in each of the above amine compounds (1) to (5), preferably has 1-6 carbon atoms, particularly 1-4 carbon atoms.

The amine compound represented by the above formula (XVII) can be obtained, for example, by subjecting about equal moles of an N-hydroxyalkylalkylenediamine and a monocarboxylic acid of 5-37 carbon atoms to a dehydration and condensation reaction. The diamine is preferably, for example, a primary and secondary diamine having a primary hydroxyl group, such as hydroxyethylaminoethylamine, N-hydroxyethylpropylenediamine, N-hydroxyethylbutylenediamine, N-hydroxyethylpentylenediamine, N-hydroxyethylhexylenediamine or the like. The monocarboxylic acid includes, for example, mixed fatty acids such as coconut oil fatty acid, castor oil fatty acid, rice bran oil fatty acid, soybean oil fatty acid, tall oil fatty acid, dehydrated castor oil fatty acid, safflower oil fatty acid, linseed oil fatty acid, tung oil fatty acid and the like; caprylic acid; capric acid; lauric acid; myristic acid; palmitic acid; stearic acid; oleic acid; ricinoleic acid; linolic acid; linolenic acid; eleostearic acid; 12-hydroxystearic acid; and behenic acid.

The reaction between the diamine and the monocarboxylic acid for obtaining an amine compound represented by the formula (XVII) is conducted by mixing the two components in about equal moles and removing a given amount of the generated water with an organic solvent such as toluene, methyl isobutyl ketone or the like. The remaining organic solvent is removed by a reduced pressure method or the like to obtain an intended amine compound. The thus obtained amine compound preferably has an amine (secondary amine) value of 88-350, particularly 120-230 and a hydroxyl (preferably primary hydroxyl) value of 44-350, particularly 60-230.

Of the compounds (1) to (6) each as the component (A-2), there are preferred the compounds (2), the compounds (3) and the primary alkanol-containing secondary amines of the compounds (6). Combined use of an amine compound of formula (XVII) (particularly, hydroxyethylaminoethyl fatty acid amide) and diethanolamine is particularly preferable because it can improve, for example, the smoothness and corrosion resistance of coating film surface. The proportions of said amine compound (preferably, hydroxyethylaminoethyl fatty acid amide) and diethanolamine are preferably 30-80% by weight and 70-20% by weight, respectively, based on the total weight of the two components.

Component (A-3): a phenol compound having at least one phenoic hydroxyl group in the molecule.

As said phenol compound, there can be mentioned, for example, polyphenol compounds such as bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tertbutyl-phenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenol novolac, cresol novolac and the like. There can also be sued monophenol compounds such as phenol, nonylphenol, α- or β-naphthol, p-tert-octylphenol, o- or p-phenylphenol and the like.

In order to form a coating film of higher corrosion resistance, it is preferable that there be used, as the component (A-3), particularly a bisphenol resin derived from a bisphenol, such as bisphenol A [bis(4-hydroxyphenyl)-2,2-propane] bisphenol F [bis(4-hydroxyphenyl)-2,2-methane] or the like. Particularly suitable as such a bisphenol resin is one having a number-average molecular weight of at least 200, preferably about 800-about 3,000 and, on an average, two or less, preferably 0.8-1.2 phenolic hydroxyl group in the molecule, represented by the following general formula (XVIII):

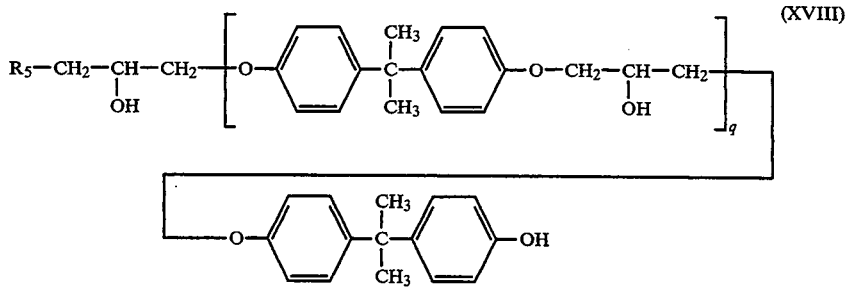

wherein q is an integer of 0-7 on an average and R₅ is a residue of an active-hydrogen-containing compound.

As the active-hydrogen-containing compound which is a precursor of the R₅ of the above formula, there can be mentioned, for example, amines such as secondary amine and the like; phenols such as phenylphenol, nonylphenol and the like; organic acids such as fatty acid and the like; thiols; alcohols such as alkyl alcohol, cellosolve, butyl cellosolve carbitol and the like; and inorganic acids. Of these compounds, most preferable are dialkanolamines which are each a secondary amine having a primary hydroxyl group; phenols such as nonylphenol, phenylphenol, phenol, hydroquinone monomethyl ether and the like; fatty acids such as stearic acid, oleic acid, soybean oil fatty acid and the like; organic acids such as acetic acid, formic acid, hydroxyacetic acid and the like; and so forth.

The above formula (XVIII) representing the component (A-3) has R₅— and —OH at the two ends. However, the component (A-3) may also contain a compound having only R₅— or —OH at the Two ends.

In the present invention, the component (A-3) can be obtained, for example, by reacting (a) 1 mole of a polyepoxide of bisphenol A diglycidyl ether type having a molecular weight of 200 or more, preferably 380-2,000, (b) 1 mole of a polyphenol of bisphenol A type having a molecular weight of at least 200, preferably 200-2,000 and (c) 1 mole of an active-hydrogen-containing compound, for example, a secondary dialkanolamine in the presence of a catalyst and/or a solvent as necessary, at temperature of 30°-300° C., preferably 70°-180° C. The above molar ratio is merely illustrative and not restrictive, and can be determined as desired.

The component (A-3) can also be obtained by reacting the above phenolic compound with a polyol (e.g. dimerdiol, ethylene glycol, propylene glycol or butylene glycol), a polyether polyol (e.g. polyethylene glycol, polypropylene glycol or polybutylene glycol), a polyester polyol (e.g. polycaprolactone), a polycarboxylic acid, a polyisocyanate, a monoisocyanate, an oxide of an unsaturated compound (e.g. ethylene oxide, propylene oxide, butylene oxide or styrene oxide), a glycidyl ether of a hydroxyl group-containing compound (e.g. allyl glycidyl ether, polypropylene glycol diglycidyl ether, 2-ethylhexyl glycidyl ether, methyl glycidyl ether, butyl glycidyl ether or phenyl glycidyl ether), a glycidyl ester of an organic acid such as fatty acid or the like, a compound having an alicyclic oxirane group, or the like; or by graft-polymerizing δ-4-caprolactone, an acrylic monomer or the like to the above phenolic compound.

The reaction between the component (A-1), the component (A-2) and the component (A-3) can be conducted by any ordinary process and the reaction order thereof is not particularly restricted. The reaction can be conducted generally at 50°-300° C., preferably 70°-200° C. For example, the component (A-1) and the component (A-3) are reacted and then the component (A-2) is reacted.

It is also possible that a polyepoxide and a polyphenol, both of which are raw materials of the component (A-3) having a phenolic hydroxyl group, be reacted in the presence of the component (A-1) and the component (A-2) to save the step for production of the component (A-3).

In another possible process, part of the component (A-1) is reacted with the component (A-2); to the reaction mixture is added the component (A-3) in an amount larger than the equivalents of the unreacted epoxy groups in the reaction product, derived from the component (A-1), to give rise to a reaction; thereafter, the unreacted portion of the component (A-3) is reacted with a polyepoxide other than the component (A-1).

The proportions of the components (A-1), (A-2) and (A-3) used can be determined as desired.

The component (A-1), even when contained in a small amount in the present resin composition for cationic electrocoating, can significantly improve the dispersibility in water and throwing property of said cationic electrocoating. Hence, the amount of the component (A-1) can be 0.5-95% by weight, preferably 3-75% by weight, particularly preferably 5-50% by weight based on the total amount of the components (A-1), (A-2) and (A-3).

The preferable amount of the component (A-3) is 1-95% by weight, preferably 20-90% by weight, more preferably 40-80% by weight based on the total amount of the components (A-1), (A-2) and (A-3) in order to impart a bisphenol skeleton and high corrosion resistance.

In the component (A) of the present invention, the content of cationic groups is desirably a level enabling stable dispersion in water and yet being low. Preferably, the content is generally 3-200, particularly 5-180, more particularly 15-150 in terms of amine value expressed in KOH mg per g of solid content. Even when the content of the cationic groups is less than 3, dispersion in water is possible by the use of a surfactant or the like. In this case, however, the cationic groups is (are) desirably controlled so that the resulting aqueous dispersion has a pH of 4-9, preferably 6-7.

Further, in the component (A), preferably the content of the primary hydroxyl groups formed by the reaction between the component (A-2) and the epoxy group-containing functional groups of formula (II) in the component (A-1) is generally 10-1,000, particularly 30-500, more particularly 50-200 in terms of hydroxyl value of said primary hydroxyl groups, expressed in KOH mg per g of solid content, in view of the reactivity with curable functional groups.

In the reaction of the components (A-1), (A-2) and (A-3) for obtaining the component (A) of the present invention, part of the component (A-2) may be replaced by other cationizing agent as necessary. As such a cationizing agent, there can be mentioned, for example, primary amines such as methylamine, ethylamine, n- or isopropylamine and the like; secondary amines such as diethylamine, dipropylamine, dibutylamine and the like; and polyamines such as ethylenediamine, diethylenetriamine, ethylaminoethylaine, methylaminopropylamine, dimethylaminoethylamine, dimethylaminopropylamine and the like. As the other cationizing agent, there can also be used ammonia, hydrazine, N-hydroxyethylimidazoline, etc.

As the other cationizing agent, there can further be used compounds having in the molecule, a secondary hydroxyl group, a secondary amino group and an amido group, which can be obtained by using a primary and secondary diamine having a secondary hydroxyl group, in place of the primary and secondary diamine having a primary hydroxyl group, used in the production of the component (A-2) (6) and reacting said primary and secondary diamine with a monocarboxylic acid.

As the other cationizing agent, there can be furthermore used tertiary amines such as triethylamine, triethanolamine, N,N-dimethylethanolamine, N-methyldiethanolamine, N,N-diethylethanolamine, N-ethyldiethanolamine and the like. These tertiary amines can be quaternized by protonation with an acid and subsequent reaction with epoxy groups.

As the other cationizing agent, there can be used, besides the above-mentioned amino compounds, a salt between a sulfide (e.g. diethyl sulfide, diphenyl sulfide, tetramethylene sulfide or thiodiethanol) and boric acid, carbonic acid, an organic monocarboxylic acid or the like, and the epoxy groups in the resin (A) are reacted with said salt to introduce tertiary sulfonium salt groups. As the other cationizing agent, there can also be sued a salt between a phosphine (e.g. triethylphosphine, phenyldimethylphosphine, diphenylmethylphosphine or triphenylphosphine) and an acid such as mentioned above, and the epoxy groups in the resin (A) are reacted with said salt to introduce quaternary phosphonium salt groups.

When part of the component (A-2) is replaced by other cationizing agent, the amount of the other cationizing agent used is not particularly restricted as long as the resulting component (A) has primary hydroxyl group(s) in the above mentioned amount (preferably, 10-1,000, particularly preferably 50-700).

The component (A) has excellent dispersibility in water and, when added to an organic or inorganic substance which has no or only slight dispersiblity in water, allows the substance to have improved dispersibility in water. Therefore, the component (A) or the present resin composition for aqueous coating may be added to conventional cationic electrocoatings for their improvement in dispersibility in water.

The present resin composition for aqueous coating is characterized in that the component (A) is used in combination with a compound (B) as a curing agent, having, in the molecule, at least two glycidyl groups each in a glycidylamino group represented by the above formula (I) directly bonding to a carbon atom of the aromatic ring.

Component (B): a compound having, in the molecule, at least two glycidyl groups each in a glycidylamino group represented by the following formula (I)

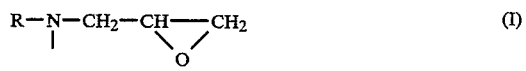
(I)

(R is a group selected from a hydrogen atom and a glycidyl group) directly bonding to carbon atoms of the aromatic ring.

The component (B) has an aromatic ring and glycidyl groups in the molecule. In the component (B), each of said glycidyl groups is introduced by the glycidylamino group represented by the formula (I), and the nitrogen atom in the formula (I) bonds directly to a carbon of the aromatic ring.

The component (B) can be obtained generally by contacting the amino group (—$NH_2$) of an aniline derivative with an epihalohydrin (preferably epichlorohydrin) in the presence of a catalyst such as aqueous alkali metal hydroxide solution or the like to give rise to a dehydrohalogenation (condensation) reaction. This reaction can be conducted by a per se known process.

In this reaction, theoretically one mole of glycidyl group is introduced into the amino group by reacting 1 mole of an epihalohydrin with 1 mole of the amino group. The resulting amino group has one remaining hydrogen atom which corresponds to the R (a hydrogen atom) of the formula (I). In this reaction, when two moles of the epihalohydrin are reacted, two glycidyl groups are introduced into the amino group and one of these glycidyl groups corresponds to the R (a glycidyl group) of the formula (1). The above aniline derivative is, in a broad definition, a compound having an aromatic ring such as benzene ring, naphthalene ring or the like and at least one amino group (—$NH_2$) directly bonding to a carbon atom of said aromatic ring. As the aniline derivative, there can be mentioned, for example, monoaniline derivatives having an aromatic ring such as benzene ring, naphthalene ring or the like and one amino group (—$NH_2$) directly bonding to a carbon atom of the aromatic ring, such as aniline, o-toluidine, m-toluidine, p-toluidine, o-ethylaniline, m-ethylaniline, p-ethylaniline, p-cresidine, 2,4-xylidine, 3,4-xylidine, o-anisidine, p-anisidine, naphthylamine and the like; and dianiline derivatives having an aromatic ring such as benzene ring, naphthalene ring or the like and two amino groups (—$NH_2$) directly bonding to carbon atoms of the aromatic ring, such as phenylenediamine, 2,4-toluylenediamine, diaminobenzanilide, dianisidine, diaminodiphenyl ether, 3,5-diaminochlorobenzene, 3,3'-dimethylbenzidine, 1,5-naphthylenediamine and the like.

The aniline derivative may also be a polycondensate obtained by reacting the above mono- or dianiline derivative with an aldehyde (e.g. formaldehyde or acetaldehyde) or a ketone (e.g. acetone, methyl ethyl ketone or methyl isobutyl ketone) using, as a catalyst, an inorganic acid (e.g. hydrochloric acid, phosphoric acid or sulfuric acid), an organic acid (e.g. p-toluenesulfonic acid or oxalic acid), a metal salt (e.g. zinc acetate) or the like to form a plurality of aromatic rings bonded with methylene group(s) or the like. In the above polycondensate, the number of the recurring unit of aromatic rings is preferably 2–40, particularly preferably 2-20. Such a polycondensate can be exemplified by diaminodiphenylmethane, 3,3'-dimethyl-4,4'-diaminodiphenylmethane and 3,3'-diethyl-4,4'-diaminodiphenylmethane. Of course, other polycondensates can be used.

With respect to the component (B), part of the glycidyl groups may be reacted, for modification, with at least one compound selected from phenols such as bisphenol A, bisphenol F, phenylphenol, nonylphenol, phenol and the like; higher fatty acids such as dimer acids, stearic acid, oleic acid, soybean olifatty acid and the like; organic acids such as formic acid, acetic acid, hydroxyacetic acid and the like; alcohols such as alkyl alcohol, cellosolve, carbitol and the like; and so forth. Of these compounds, particularly preferable are phenols and higher fatty acids. In the modification, use of a catalyst such as zinc borofluoride, tetramethylammonium chloride or the like is preferable.

The component (B) used in the present invention preferably has a number-average molecular weight as measured by vapor-pressure osmometry, of about 150-about 8,000, particularly 150–5,000, more particularly 200–3,000 and epoxy equivalents of 100–2,000, particularly 100–600, more particularly 100–400. As the component (B), there may be used commercial products, for example, GAN [N,N-diglycidylaniline manufactured by Nippon Kayaku CO., LTD.], GOT [N,N-diglycidyl-o-toluidine manufactured by Nippon Kayaku CO., LTD.], MY 720 [N,N,N',N'-tetraglycidyl-4,4'-diaminodiphenylmethane manufactured by Ciba-Geigy (Japan) Limited] any MY 722 [N,N,N'-N'-tetraglycidyl-3,3'-dimethyl-4,4'-diaminodiphenylmethane manufactured by Ciba-Geigy (Japan) Limited].

The present resin composition for aqueous coating can be prepared by neutralizing part or the whole part of the basic groups of the component (A) with an acid, mixing the resulting compound with the component (B), and dissolving or dispersing the mixture in water. The neutralization can be conducted before or after the mixing of the two components. As the acid used for neutralization, there can be mentioned, for example, formic acid, acetic acid, lactic acid, butyric acid and a cation acid. The proportions of the component (A) and the component (B) can be varied over a wide range depending upon the applications of the resulting resin composition for aqueous coating, but preferably are the component (A)/the component (B)=30/70 to 90/10, particularly 50/50 to 85/15, more particularly 60/40 to 70/30.

Component (C)

This is a curing catalyst used for conducting a cross-linking reaction between the component (A) and the component (B) contained in the present resin composition, at lower temperature.

Such a catalyst is at least one compound selected from lead compounds, zirconium compounds, cobalt compounds, aluminum compounds, manganese compounds, copper compounds, zinc compounds, iron compounds, bismuth compounds and nickel compounds. Specific example of the catalyst are chelate compounds such as zirconium acetylacetonate, cobalt acetylacetonate, aluminum acetylacetonate, manganese acetylacetonate, iron acetylacetonate and the like; chelate reaction products between a compound having a $\beta$-hydroxyamino structure and lead (II) oxide; and carboxylates such as lead 2-ethylhexanoate, lead dimethylhexanoate, lead naphthenate, lead octenoate, lead benzoate, lead acetate, lead lactate, lead formate, lead glycolate, zirconium octenoate, bismuth octenoate, zinc octenoate and the like.

The component (C) can be mixed with the component (A) beforehand, or can be added when the component (A) and the component (B) are mixed, or may be added when the pigment(s) (mentioned later) is (are) added. The amount of the component (C) used can be varied as desired, depending upon the applications of the resulting resin composition, but preferably is generally 10% by weight or less, particularly 0.2–5% by weight based on the total solid weight of the component (A) and the component (B).

The present resin composition for aqueous coating is used as a main or auxiliary component for film formation, in an aqueous coating using water as a solvent or a dispersing medium. It can be used particularly preferably as a main or auxiliary component for film formation, in a cationic electrocoating. In such use, the present resin composition for aqueous coating can exhibit technical effects such as mentioned above.

The present resin composition for aqueous coating and the present cationic electrocoating can further comprise, as necessary, various pigments. As the pigments, there can be specifically mentioned color pigments such as carbon black, titanium white, white lead, lead oxide, red iron oxide and the like; extender pigments such as clay, talc and the like; anticorrosion pigments of inorganic metal compounds, such as strontium chromate, lead chromate, basic lead chromate, red lead, lead silicate, basic lead silicate, lead phosphate, basic lead phosphate, lead tripolyphosphate, lead silicochromate, lead suboxide, lead sulfate, basic lead sulfate, chrome yellow, lead cyanamide, calcium plumbate and the like. The present resin composition for aqueous coating and the present cationic electrocoating can furthermore comprise known dispersing agents and anticissing agents as necessary.

The method of electrocoating using the present cationic electrocoating is not strictly restricted and the application can be conducted under the conditions employed ordinarily. For example, the concentration (solid content) of the electrocoating bath can be controlled in the range of 5–40% by weight, preferably 10–25% by weight and the pH can be controlled at 5–8, preferably 5.5–7. Appropriately, the bath temperature is 20°–35° C., preferably 25°–30° C.; the current density is 0.005–2 A/cm$^2$, preferably 0.01–1 A/cm$^2$; the voltage is 10–500 V, preferably 100–300 V; and the time of flowing electricity is 0.1–10 minutes, preferably 2–4 minutes. The film thickness of electrocoating is not strictly restricted but is generally 3–200μ in terms of cured film thickness. It is preferable that after coating, the coated article be pulled up from the electrocoating bath, water-washed, air-dried as necessary, and subjected to thermal curing at 70°–250° C., preferably 120°–160° C.

DESCRIPTION OF THE PREFERRED EMBODIMENTS

Next, the present invention is described more specifically by way of Examples. In the Examples, parts and % are by parts by weight and % by weight, respectively, unless otherwise specified.

I. Production Examples (I-1) Production of components (A-2) used in preparation of components (A)

(A-2-1):

Into a flask equipped with a stirrer, a thermometer, a dropping funnel and a reflux condenser were fed 288 parts of tall oil fatty acid, 104 parts of hydroxyethylaminoethylamine and 80 parts of toluene. They were slowly heated with stirring, and 18 parts of the water generated was removed. The remaining toluene was also removed under reduced pressure to obtain an amino compound having a primary hydroxyl group. The compound had an amine value of 149, a solidification point of 50° C. and a hydroxyl value of 149.

(A-2-2):

39 parts of monoethanolamine was fed into a flask equipped with a stirrer, a thermometer, a dropping funnel and a reflux condenser. Thereto was dropwise added 100 parts of N,N-dimethylaminopropylacrylamide with the temperature kept at 60° C. A reaction was conducted at 60° C. for 5 hours.

(I-2) Production of components (A)

(A-I):

Into a flask equipped with a stirrer, a thermometer, a dropping funnel and a reflux condenser were fed 900 parts EHPE-3150 (trade name) as component (A-1) [a product of Daicel Chemical Industries, LTD. obtained by epoxidizing the vinyl groups of a ring-opening polymer of 4-vinylcyclohexene-1-oxide; epoxy equivalents=180; polymerization degree=4–15 on an average], 200 parts of ethylene glycol monobutyl ether, 315 parts of diethanolamine as component (A-2) and 370 parts of an amino compound (A-2-1). They were slowly heated with stirring for dissolution and reacted at 140° C. After it was confirmed that epoxy equivalents of 1,585 were obtained, 2,052 parts of bisphenol A as component (A-3) was added. A reaction was conducted at 150° C. for 5 hours, and it was confirmed that no epoxy group remained.

Then, there were added 420 parts of diethanolamine as component (A-2), 4,370 parts of bisphenol A diglycidyl ether having epoxy equivalents of 190 as component (A-3), 740 parts of an amino compound (A-2-1) and 2,092 parts of ethylene glycol monobutyl ether. A reaction was conducted at 150° C. for 5 hours, and it was confirmed that no epoxy group remained, whereby (A-1) was obtained which had a solid content of 80%, an amine value of 61 and primary hydroxyl group equivalents of 540.

(A-II):

Into a flask equipped with a stirrer, a thermometer, a dropping funnel and a reflux condenser were fed 900 parts of EHPE-3150 (trade name) as component (A-1) [a product of Daicel Chemical Industries, LTD.; epoxy equivalents=180], 200 parts of ethylene glycol monobutyl ether, 420 parts of diethanolamine as component (A-2) and 2,052 parts of bisphenol A as component (A-3). They were slowly heated with stirring and reacted at 140° C. It was confirmed that no epoxy group remained.

Then, there were added 630 parts of diethanolamine as component (A-2), 3,990 parts of bisphenol A diglycidyl ether having epoxy equivalents of 190 as component (A-3), 760 parts of polypropylene glycol diglycidyl ether having epoxy equivalents of 380 as component (A-3) and 1,988 parts-of ethylene glycol monobutyl ether. A reaction was conducted at 150° C. for 5 hours, and it was confirmed that no epoxy group remained, whereby (A-II) was obtained which had a solid content of 0%, an amine value of 64 and primary hydroxyl group equivalents of 438.

(A-III):

Into a flask equipped with a stirrer, a thermometer, a dropping funnel and a reflux condenser were fed 21 parts of diethanolamine, 950 parts of bisphenol A diglycidyl ether having epoxy equivalents of 190, 340 parts of polypropylene glycol diglycidyl ether having epoxy equivalents of 340 and 2,052 parts of bisphenol A. They were slowly heated with stirring and reacted at 120° C. After it was confirmed that epoxy equivalents of 980 was obtained, 479 parts of ethylene glycol monobutyl ether was added. While the system was kept at 100° C., 158 parts of diethanolamine and 43 parts of an amino compound (A-2-2) were added. A reaction was conducted until there was no viscosity increase, whereby (A-III) was obtained which had a solid content of 80%, an amine value of 54 and primary hydroxyl group equivalents of 518.

(I-3) Production of components (B)

(B-1):

Into a flask equipped with a stirrer, a thermometer and a reflux condenser were fed 100 parts of N,N-diglycidyl-o-toluidine (GOT, a product of Nippon Kayaku CO., LTD.) and 25 parts of ethylene glycol monobutyl ether. They were heated for dissolution, whereby (B-1) was obtained which had a solid content of 80% and epoxy equivalents of 117.

(B-2):

Into a flask equipped with a stirrer, a thermometer and a reflux condenser were fed 100 parts of N,N,N',N'-tetraglycidyl-4,4'-diaminodiphenylmethane [MY 720, a product of Ciba-Geigy (Japan) Limited] and 25 parts of ethylene glycol monobutyl ether. They were heated for dissolution, whereby (B-2) was obtained which had a solid content of 80% and epoxy equivalents of 115.

(B-3):

Into a flask equipped with a stirrer, a thermometer and a reflux condenser were fed 100 parts of N,N,N',N'-tetraglycidyl-3,3'-dimethyl-4,4'-diaminodiphenylmethane [MY 722, a product of Ciba-Geigy (Japan) Limited] and 25 parts of ethylene glycol monobutyl ether. They were heated for dissolution, whereby (B-3) was obtained which had a solid content of 80% and epoxy equivalents of 125.

(B-4): for comparison

Into a flask equipped with a stirrer, a thermometer and a reflux condenser were fed 100 parts of EHPE-3150 (trade name) [a product of Daicel Chemical Industries, LTD. obtained by epoxidizing the vinyl groups of a ring-opening polymer of 4-vinylcyclohexene-1-oxide; polymerization degree=4–15] and 25 parts of ethylene glycol monobutyl ether. They were heated for dissolution, whereby (B-4) was obtained which had a solid content of 80% and epoxy equivalents of 180.

(B-5): for comparison

Into a flask equipped with a stirrer, a thermometer and a reflux condenser were fed 100 parts of N,N,N',N'-tetraglycidyl-m-xylylenediamine (TETRAD-X, a product of Mitsubishi Gas Chemical Co., Inc.) and 25 parts of ethylene glycol monobutyl ether. They were heated for dissolution, whereby (B-5) was obtained which had a solid content of 80% and epoxy equivalents of 101.

(B-6): for comparison 250 parts of MDI (4,4'-diphenylmethane diisocyanate) was fed into a flask equipped with a stirrer, a thermometer and a reflux condenser, and heated and melted at 80° C. Thereto was dropwise added, at 80° C. in 60 minutes, a mixture of 130 parts of 2-ethylhexyl alcohol and 134 parts of diethylene glycol monoethyl ether. The resulting mixture was heated to 120° C. After it was confirmed that there was no absorption by an isocyanate group by IR spectrometer, 128.5 parts of ethylene glycol monobutyl ether were added, whereby (B-6) was obtained which had a solid content of 80% and blocked isocyanate equivalents of 257.

(I-4) Production of pigment pastes (p-1)

To 10 parts of each of the above-produced components (A) were added 20 parts of titanium white (Tipaque CR 93, a product of Ishihara Sangyo Kaisha, Ltd.), a 2 parts of carbon black (MA-7, a product of Mitsubishi Chemical Industries, Ltd.), 4 parts of aluminum tripolyphosphate (K white 84, a product of Teikoku Kako CO., LTD.), 24 parts of clay (Zeekilite, a product of Zeekilite Corp. Ltd.), 0.4 part of acetic acid and 39.6 parts of deionized water. They were kneaded. Then, 200 parts of glass beads were added, and the mixture was treated by a paint shaker to obtain pigment-dispersed pastes (p-1) each containing coarse particles of 10μ or less as measured by a particle gauge and having a solid content of 58%.

II. Examples and Comparative Examples

One of the components (A) and one of the components (B), both produced above, were mixed together with a neutralizing agent, as shown in Table 1. They were stirred and made into a dispersion. Thereto was added deionized water to adjust the solid content to 30%. To 333 parts of each of the thus obtained emulsions was added a mixture of 75 parts of one of the pigment pastes produced above and 2.6 parts of a catalyst (lead octenoate or zinc octenoate). Thereto was added deionized water to adjust the solid content to 20%, whereby various cationic electrocoatings were obtained. In comparative Example 4, 5.6 parts of dibutyltin dilaurate (tin content=18%) was further added as an additional catalyst.

Each of these cationic electrocoatings was applied onto a zinc phosphate-treated steel plate and an untreated steel plate by electrocoating (electrocoating bath temperature=25° C., voltage=100-250 V, time of electricity flowing=3 minutes), followed by water washing and baking at 170° C. for 30 minutes or at 160° C. for 10 minutes to obtain a cured coated film. The properties of each coating film were measured and the results are shown in Table 2.

TABLE 1

|  | Example | | | Comparative Example | | | |
| --- | --- | --- | --- | --- | --- | --- | --- |
|  | 1 | 2 | 3 | 1 | 2 | 3 | 4 |
| Component (A) | | | | | | | |
| Symbol | (A-I) | (A-I) | (A-II) | (A-I) | (A-III) | (A-II) | (A-II) |
| Amount | 100 | 100 | 100 | 91.2 | 100 | 87.5 | 87.5 |
| Component (B) | | | | | | | |
| Symbol | (B-1) | (B-2) | (B-3) | (B-4) | (B-5) | (B-6) | (B-6) |
| Amount | 25 | 25 | 25 | 33.8 | 25 | 37.5 | 37.5 |
| Neutralizing agent | | | | | | | |
| Compound name | Acetic acid | Formic acid | Formic acid | Formic acid | Formic acid | Formic acid | Formic acid |
| Amount | 1.6 | 1.2 | 1.2 | 1.2 | 1.2 | 1.2 | 1.2 |
| Deionized Water | | | | | | | |
| Amount | 204 | 207 | 207 | 207 | 207 | 207 | 201 |
| Catalyst | | | | | | | |
| Compound name | Pb | Zn | Pb | Pb | Pb | Pb | Pb |
| Amount | 2.6 | 2.6 | 2.6 | 2.6 | 2.6 | 2.6 | 2.6 |
| Compound name |  |  |  |  |  |  | DBTL |
| Amount |  |  |  |  |  |  | 5.6 |

Notes
Pb refers to lead octenoate (Pb content = 38%)
Zn refers to zinc octenoate (Zn content = 18%)
DBTL refers to dibutyltin dilaurate
(Sn content = 18%)

TABLE 2

|  | Examples | | | Comparative Example | | | |
| --- | --- | --- | --- | --- | --- | --- | --- |
|  | 1 | 2 | 3 | 1 | 2 | 3 | 4 |
| Low-temperature curability (1) | 90 | 92 | 93 | 77 | 93 | 77 | 94 |
| Gel fraction | | | | | | | |
| Bath stability | | | | | | | |
| MEQ (2) | | | | | | | |
| Initial | 27.3 | 27.7 | 27.8 | 26.5 | 27.5 | 27.3 | 27.5 |
| After storage | 25.6 | 24.9 | 25.5 | 26.0 | 8.8 | 26.4 | 27.7 |
| Particle diameter (3) | | | | | | | |
| Initial | 0.16 | 0.13 | 0.11 | 0.11 | 0.30 | 0.15 | 0.15 |
| After storage | 0.15 | 0.13 | 0.12 | 0.14 | 0.32 | 0.15 | 0.15 |
| Heating loss (4) | 3.2 | 4.2 | 3.3 | 2.8 | 3.9 | 12.3 | 15.2 |
| Weather resistance | | | | | | | |
| Gloss (5) retention | 90 | 92 | 93 | 92 | 85 | — | 45 |
| Corrosion (6) resistance | o | o | o | x | o | x | o |
| Orgaustin | Not present | Not present | Not present | Not present | Not present | Not present | present |

Test Methods (1) Low-temperature curability

An electrocoating was coated on a zinc phosphate-treated steel plate (cured film thickness=20μ). Then, baking was made at 160° C. for 10 minutes. The coated plated was immersed in acetone of 30° C. for 48 hours. A reduction (%) of film weight before and after acetone immersion was calculated according to the following formula.

Gel fraction (%) = [(weight after acetone immersion − weight of uncoated steel plate)/ (weight before acetone immersion − weight of uncoated steel plate)] × 100

(2) MEQ

An emulsion having a solid content of 30%, produced in accordance with the compounding recipe of Table 1 was accurately weighed in an amount of about 10 g. Potentiometric titration was conducted for the emulsion using a 1/10N alcoholic KOH solution to determine the acid amount contained therein. Then, MEQ was calculated using the following formula. A case in which the difference of MEQ after storage from initial MEQ is smaller, is better.

MEQ=[(amount (ml) of 1/10N KOH solution used × 10)]/[sample amount (g)]

(3) Particle diameter

Was measured using Nanosizer N-4 (trade name) manufactured by Coulter Electronics Inc.

(4) Heating loss

An electrocoating was coated on a zinc phosphate-treated steel plate (weight=Wo) by electrocoating under the above-mentioned conditions, so as to give a cured coating film of 20μ. The coated plate was dried in a vacuum dryer at 80° C. for 1 hour (the weight of the coated plate after drying=W1). Then, baking was conducted at 180° C. for 30 minutes (the weight of the coated plate after baking=W2). The heating loss of the electrocoating sample was calculated using the following formula.

Heating loss (%)=[(W1−W2)/(W1−Wo)]×100

(5) Gloss retention

Electrocoating was made as above (cured film thickness=20μ). Then, baking was conducted at 170° C. for 20 minutes. The resulting coated plate was subjected to accelerated exposure for 200 hours in a sunshine weatherometer (light amount=1,100 Kjoule/m².hr). Change (%) of gloss (60° mirror reflectivity) before and after exposure was calculated using the following formula. Gloss measurement was made using a digital gloss meter (Model GM-26D, a product of Murakami Colour Research Laboratory).

Gloss retention (%) = [60° gloss after 200-hour exposure)/(initial 60° gloss)] × 100

(6) Corrosion resistance

Electrocoating was made as above (cured film thickness=20μ). Then, baking was conducted at 160° C. for 10 minutes. The resulting coated plate was subjected to a salt spray test by JIS Z 2371. (Before the test, cut was made in the coated plate.) After the test, the width (one side width) of blister developed from the cut line was measured. When the width was 2.0 mm or less, the corrosion resistance of the electrocoating sample used was rated as ◯; and when the width was 5 mm or more, the corrosion resistance was rated as X. Incidentally, the test period was 1,000 hours.

What is claimed is:

1. A resin composition for aqueous coating, comprising as main components:
   (A) a resin having hydroxyl groups and cationic groups, and being a resin obtained by reacting the epoxy group-containing functional groups of an epoxy resin (A-1) having at least three epoxy group-containing functional groups each represented by the following formula (II)

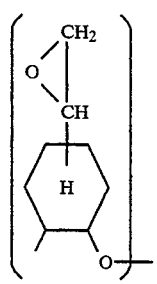

(II)

with at least one amine compound (A-2) having at least one primary hydroxyl group in a molecule and a phenol compound (A-3) having at least one phenolic hydroxyl group in a molecule, and
   (B) a compound having, in a molecule, an aromatic ring and at least two glycidyl groups, said glycidyl groups being covalently linked to a nitrogen atom to form at least one glycidylamino group represented by the following formula (I)

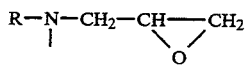

(I)

wherein R is selected from a hydrogen atom or a glycidyl group, so that when R is a hydrogen atom, the molecule contains at least two glycidylamino groups represented by the formula (I), and when R is a glycidyl group, the molecule contains at least one glycidylamino group represented by the formula (I), and wherein the nitrogen atom of said at least one glycidylamino group is directly bonded to a carbon atom of the aromatic ring.

2. A composition according to claim 1, wherein the epoxy resin (A-1) is obtained by subjecting 4-vinylcyclohexene-1-oxide alone or with another epoxy group-containing compound to ring-opening (co)polymerization by the epoxy group(s) contained therein, using an active-hydrogen-containing organic compound as an initiator to form a polyether resin, and then epoxidizing the vinyl groups of the 4-vinylcyclohexene-1-oxide portions present in the side chains of said resin, with an oxidizing agent selected from peroxide or hydroperoxide, to form functional groups each represented by formula (II).

3. A composition according to claim 2, wherein the other epoxy group-containing compound is selected from the group consisting of α-olefin epoxides, styrene oxide, glycidyl ethers of hydroxyl group-containing compounds, glycidyl esters of organic acids, and alicyclic oxirane group-containing vinyl monomers.

4. A composition according to claim 1, wherein the content of the epoxy group-containing functional groups represented by formula (II), in the epoxy resin (A-1) is in the range of 140-1,000 in terms of epoxy equivalents.

5. A composition according to claim 1, wherein the at least one amine compound (A-2) is selected from the group consisting of (a) at least one member selected from the group consisting of monoalkanolamines, N-alkylalkanolamines, dialkanolamines, monoalkanolamine-$\alpha,\beta$-unsaturated carbonyl compound adducts, monoalkanolaminoalkylamines, and condensates between a ketone and at least one member selected from the group consisting of hydroxyethylamine, hydroxyethylhydrazine and hydroxybutylhydrazine and (b) amine compounds represented by the following formula (XVII)

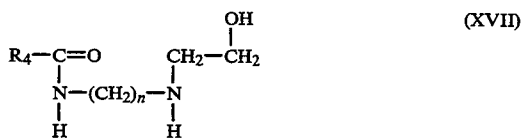

(n is an integer of 1-6 and $R_4$ is a $C_{4-36}$ hydrocarbon chain which may optionally contain a hydroxyl group and/or a polymerizable unsaturated group).

6. A composition according to claim 5, wherein the amine compound (A-2) is selected from the group consisting of N-alkylalkanolamines, dialkanolamines, monoalkanolamine-$\alpha,\beta$-unsaturated carbonyl compound adducts, and amine compounds represented by formula (XVII).

7. A composition according to claim 5, wherein the at least one amine compound (A-2) consists of an amine compound of formula (XVII) and diethanolamine.

8. A composition according to claim 1, wherein the phenol compound (A-3) is selected from the group consisting of bis(4-hydroxyphenyl)-2,2-propane, 4,4'-dihydroxybenzophenone, bis(4-hydroxyphenyl)-1,1-ethane, bis(4-hydroxyphenyl)-1,1-isobutane, bis(4-hydroxy-tertbutyl-phenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4'-dihydroxydiphenyl ether, 4,4'-dihydroxydiphenylsulfone, phenol novolac, cresol novolac, phenol, nonylphenol, $\alpha$-and $\beta$-naphthol, p-tert-octylphenol and o- and p-phenylphenol.

9. A composition according to claim 1, wherein the phenol compound (A-3) is a bisphenol resin having, on average, a number-average molecular weight of about 800 to about 3,000 and having, on average, 0.8-1.2 phenolic hydroxyl groups in a molecule.

10. A composition according to claim 9, wherein the phenol compound (A-3) is a phenolic resin represented by formula (XVIII)

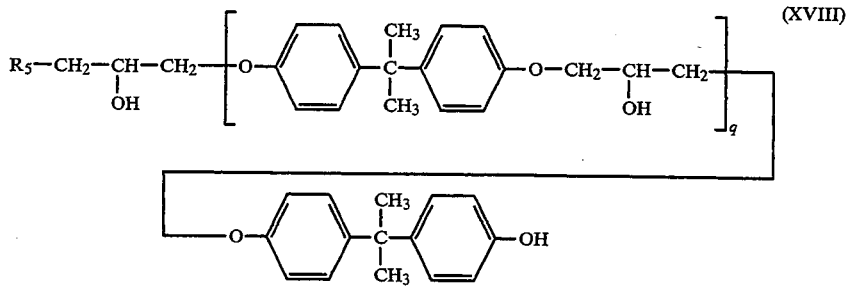

wherein q is an integer of 0-7 on average and $R_5$ is a residue of an active-hydrogen-containing compound.

11. A composition according to claim 1, wherein the epoxy resin (A-1) is used in an amount of 0.5-95% by weight based on the total weight of the components (A-1), (A-2) and (A-3).

12. A composition according to claim 1, wherein the pheonol compound (A-3) is used in an amount of 1-95% by weight based on the total weight of the components (A-1), (A-2) and (A-3).

13. A composition according to claim 1, wherein the content of cationic groups in the resin (A) is in the range of 3-200 in terms of amine value expressed in KOH mg per g of solid content.

14. A composition according to claim 1, wherein the content of primary hydroxyl groups in the resin (A) is in the range of 10-1,000 in terms of hydroxyl value.

15. A composition according to claim 1, wherein the compound (B) is a reaction product of aniline or a derivative thereof with an epihalohydrin.

16. A composition according to claim 15, wherein the aniline or aniline derivative is selected from the group consisting of aniline, o-toluidine, m-toluidine, p-toluidine, o-ethylaniline, m-ethylaniline, p-ethylaniline, p-cresidine, 2,4-xylidine, 3,4-xylidine, o-anisidine, p-anisidine, naphthylamine, phenylenediamine, 2,4-toluylenediamine, diaminobenzanilide, dianisidine, diaminodiphenyl ether, 3,5-diaminochlorobenzene, 3,3'-dimethylbenzidine, 1,5-naphthylenediamine, diaminodiphenylmethane, 3,3'-dimethyl-4,4'-diaminodiphenylmethane and 3,3'-diethyl-4,4'-diaminodiphenylmethane.

17. A composition according to claim 1, wherein the compound (B) has a number-average molecular weight in the range of about 150-about 8,000 as measured by vapor-pressure osmometry.

18. A composition according to claim 1, wherein the compound (B) has epoxy equivalents in the range of 100-2,000.

19. A composition according to claim 1, wherein the ratio of the resin (A)/the compound (B) is in the range of 30/70 to 90/10 in terms of the weight ratio of the solid contents of the two components.

20. A composition according to claim 1, wherein the ratio of the resin (A)/the compound (B) is in the range of 50/50 to 85/15 in terms of the weight ratio of the solid contents of the two components.

21. A composition according to claim 1, further comprising at least one curing catalyst (C) selected from the group consisting of lead compounds, zirconium compounds, cobalt compounds, aluminum compounds, manganese compounds, copper compounds, zinc compounds, iron compounds, bismuth compounds and nickel compounds.

22. A composition according to claim 21, wherein the curing catalyst (C) is selected from the group consisting of zirconium acetylacetonate, cobalt acetylacetonate, aluminum acetylacetonate, manganese acetylacetonate, iron acetylacetonate, chelate reaction products between a compound having a β-hydroxyamino structure and lead (II) oxide, lead 2-ethylhexanoate, lead dimethylhexanoate, lead naphthenate, lead octenoate, lead benzoate, lead acetate, lead lactate, lead formate, lead glycolate, zirconium octenoate, bismuth octenoate and zinc octenoate.

23. A composition according to claim 21, wherein the curing catalyst (C) is used in an amount of 0.2–5% by weight based on the total solid content of the components (A) and (B).

24. A cationic electrocoating paint comprising, as the main component, a composition for aqueous coating according to claim 1.

25. A coated article which is coated with the cationic electrocoating paint of claim 24.

* * * * *